United States Patent [19]

Walton

[11] 4,388,524
[45] Jun. 14, 1983

[54] ELECTRONIC IDENTIFICATION AND RECOGNITION SYSTEM WITH CODE CHANGEABLE REACTANCE

[76] Inventor: Charles A. Walton, 19115 Overlook Rd., Los Gatos, Calif. 95030

[21] Appl. No.: 302,706

[22] Filed: Sep. 16, 1981

[51] Int. Cl.³ .............................................. G06K 5/00
[52] U.S. Cl. .................................... 235/380; 235/449; 235/439; 235/488; 340/825.3; 340/825.72; 340/825.31; 343/6.5 R; 343/6.5 SS
[58] Field of Search ............................. 375/91, 66, 62; 340/696, 825.3, 825.72, 825.31; 235/380, 449, 488, 439; 343/763, 6.5 R, 6.5 SS; 455/134; 328/165, 167; 331/2; 375/81, 119

[56] References Cited

U.S. PATENT DOCUMENTS

| | | | |
|---|---|---|---|
| 3,752,960 | 8/1973 | Walton | 235/439 |
| 3,816,708 | 6/1974 | Walton | 235/439 |
| 3,958,105 | 5/1976 | Sidlauskas | 235/439 |
| 4,223,830 | 9/1980 | Walton | 235/380 |
| 4,236,068 | 11/1980 | Walton | 235/380 |

Primary Examiner—G. Z. Rubinson
Assistant Examiner—R. Lev
Attorney, Agent, or Firm—Thomas E. Schatzel

[57] ABSTRACT

An electronic identification and recognition system in which the recognition portion includes a voltage controlled oscillator which sweeps over a range of frequencies. The identification portion resonates at certain frequencies determined by a variable reactance in the resonant circuit in the identifier which is responsive to bits from a sequential data register. The bits result in the on-and-off switching of the variable reactance which modifies the resonant frequency in the identification portion or modifies the frequency of an oscillator in the identification portion. The changes and sequence of changes in the resonant frequency are detected and recorded by the recognition portion such that the internal code of the identifier is determined.

15 Claims, 3 Drawing Figures

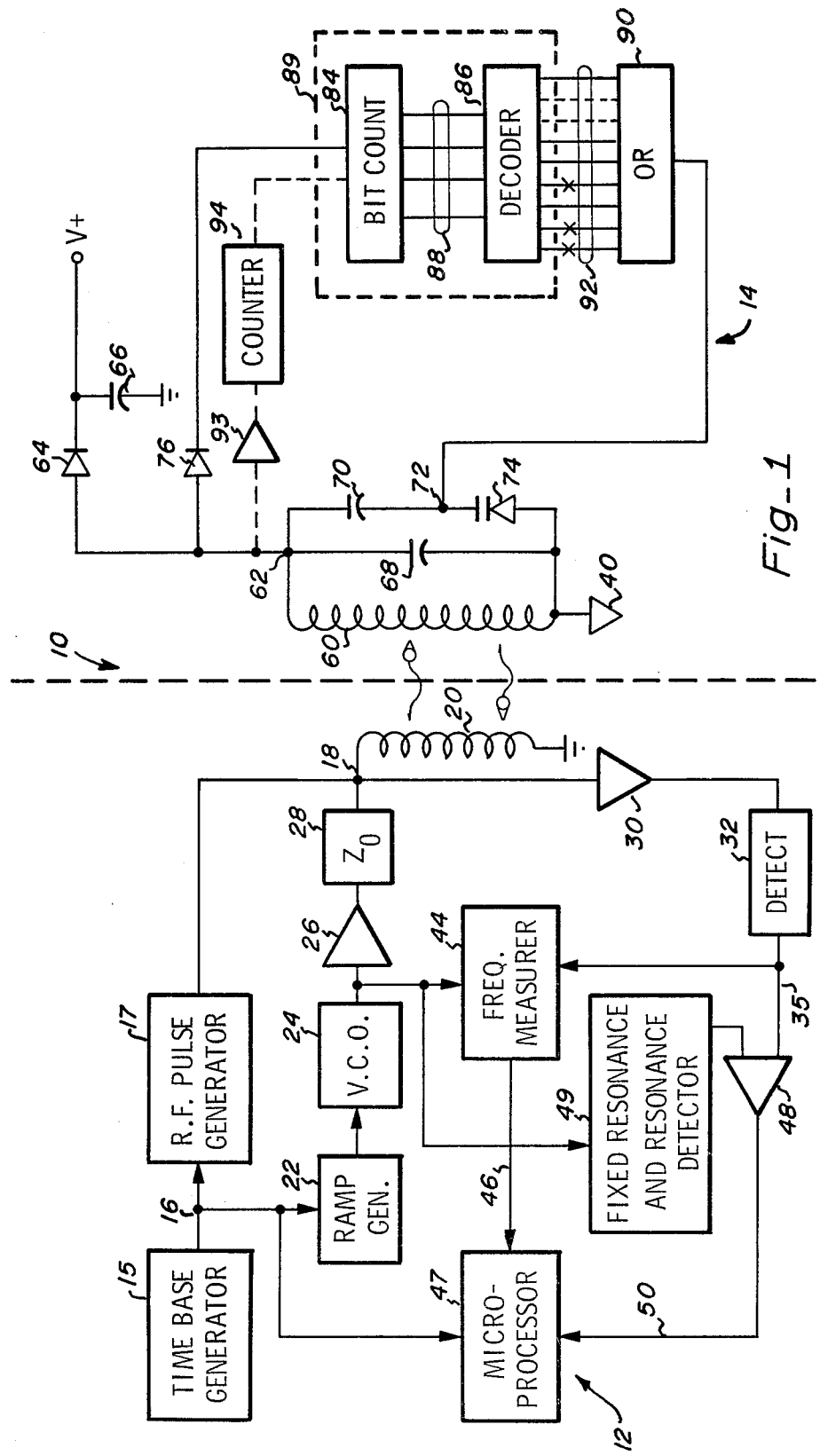
Fig_1

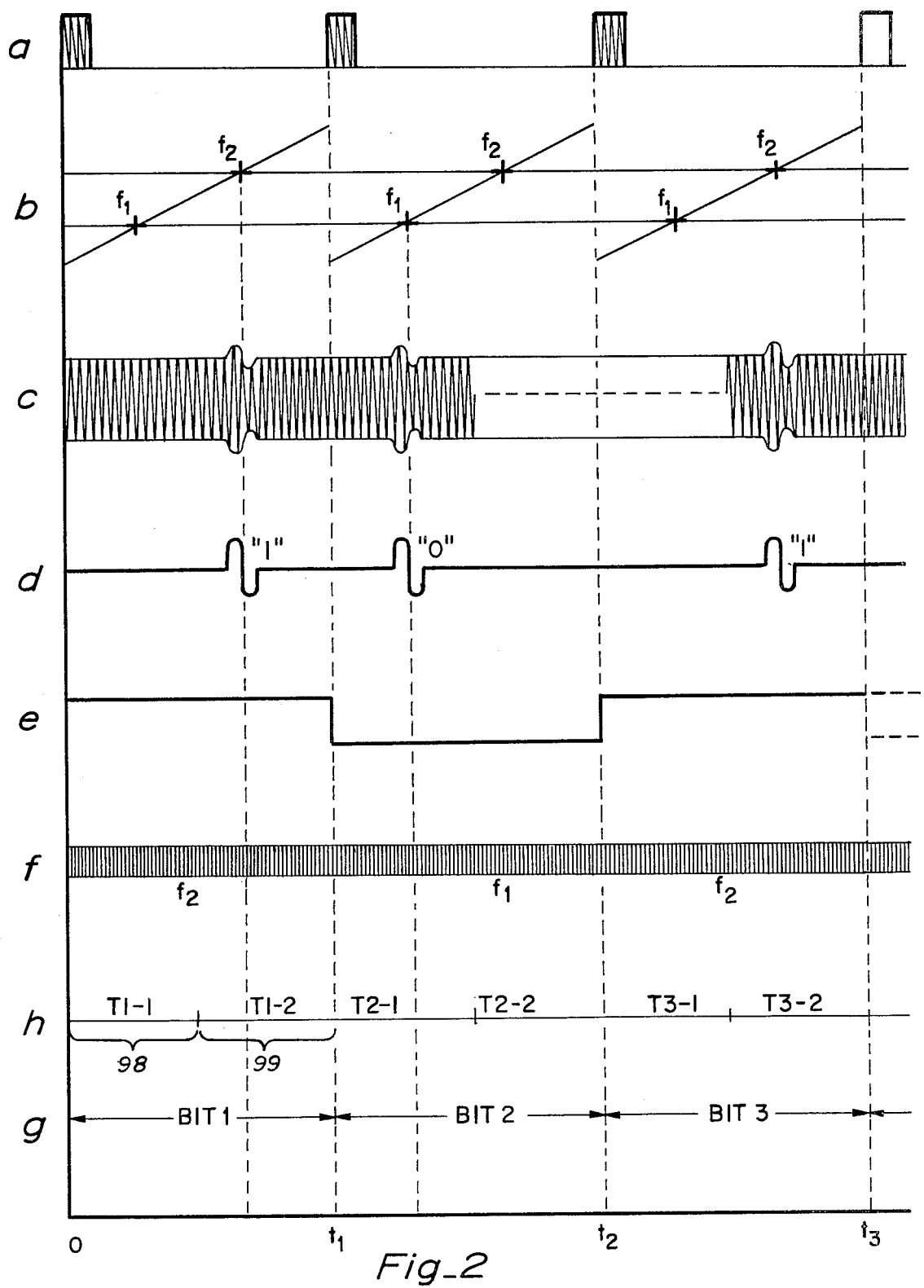
Fig_2

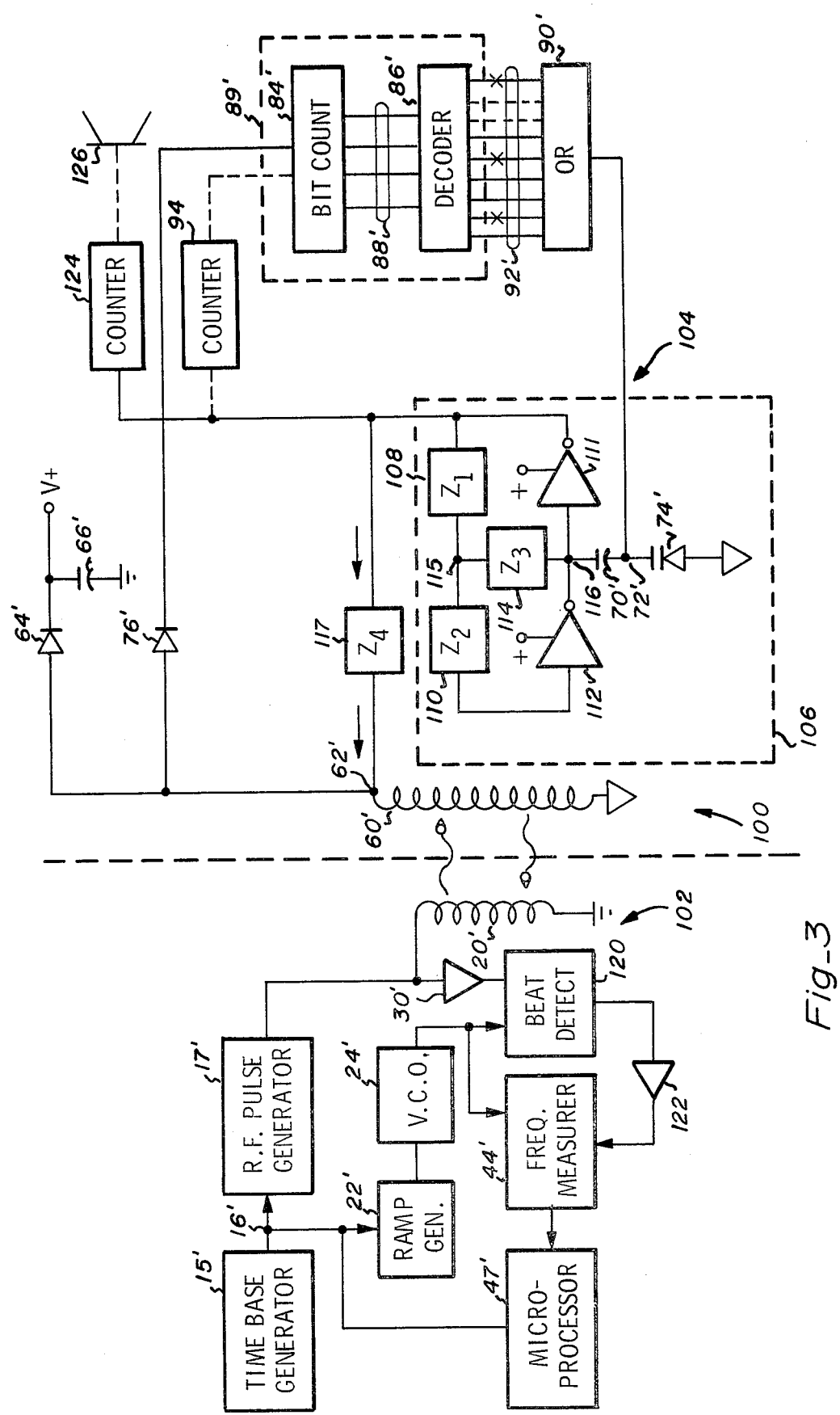
Fig_3

ELECTRONIC IDENTIFICATION AND RECOGNITION SYSTEM WITH CODE CHANGEABLE REACTANCE

BACKGROUND OF THE INVENTION

1. Field of the Invention

The present invention relates generally to electronic identification and recognition systems and more specifically to an electronic identification and recognition system wherein the identifier incorporates a code changeable reactance.

2. Description of the Prior Art

There are various electronic identifying systems wherein the identifier may be in the form of an electronically passive card-type structure. For example, U.S. Pat. No. 3,752,960 entitled "Electronic Identification and Recognition System", granted to the current inventor; U.S. Pat. No. 4,223,830 entitled "Personal Identification and Signaling System", granted to the current inventor; and U.S. Pat. No. 4,196,418 entitled "Detection Plate for an Identification System", granted to Harm J. Kip are illustrative. The U.S. Pat. No. 3,752,960 uses a simple card circuit but has the disadvantage of a limited number of codes and some loss of detection range due to the fact that only one half or one quarter of the card is dedicated to the inductive pick-up loop. U.S. Pat. No. 4,223,830 may incorporate numerous codes but has a disadvantage of requiring a separate power source. The U.S. Pat. No. 4,196,418 has a disadvantage of not being resonant for portions of its cycle and therefore unable to send or receive a positive radiated signal when in the damped or detuned mode, nor is its receiver portion capable of measuring the frequency of the identifier card, nor can additional information be sent through choice of a second radio frequency.

U.S. patent application Ser. No. 221,720, by the present inventor, filed Dec. 31, 1980, refers to a radio frequency emitting identifier which uses a single radio frequency and requires lengthy transmission time. U.S. patent application Ser. No. 264,856, by the present inventor, used two frequencies but requires two oscillators in the identification element and does not have a code switchable reactance.

SUMMARY OF THE PRESENT INVENTION

It is an object of the present invention to provide a recognition and identification system having a large code population.

It is a further object of the present invention to provide an identification and recognition system that does not require a separate power source in the identifier portion.

It is a further object of the present invention to provide an electronic identification and recognition system which is efficient in rejecting noise and in minimizing transmission time.

In an exemplary embodiment of the present invention the system incorporates a recognition portion and an identifier portion. The recognition portion in a first embodiment incorporates a voltage controlled oscillator which is capable of sweeping through a band of frequencies. The oscillator is connected to an antenna means which radiates such frequencies and the recognition system searches for return radiation of the same frequency. The identification portion may be in the form of a flat card, e.g. credit card configuration, bearing a loop antenna with a shunt reactance. The identification portion responds by resonating at one of the radiated frequencies and reflecting a signal at this frequency back to the recognition portion. The value of the resonant frequency in the identifier portion is changeable by switching in and/or out a variable reactance. The advance through a code sequence is determined by a counter and decoder logic within the identifier portion. The decoder output is a set of lines (equivalent to time positions) which are encoded with the desired identification code and which switch in or out the variable reactance which in turn determines the value of the resonant frequency. Such changes in the resonant frequency are detected by the recognition portion. These changes represent the code of the identification portion and it may be reported to data processing equipment at the recognition portion for any further data processing or action. For example, the information, after decoding, may be utilized to open or close doors, allow the lifting of a parking lot gate, notify a central authority, disperse funds, etc.

Electrical power to operate the logic of the identifier portion is obtained from pulses sent from the reader portion to the identifier portion. These pulses are rectified within the identifier portion and the resulting energy stored in a capacitor to provide a power source for the necessary components in the identifier portion. Such pulses also may be communicated to the identification portion in a timed manner to define intermediate data transmission cycles.

A second embodiment of a system of the present invention includes oscillator circuitry within the identifier portion of which the frequency is determined by the switchable reactive elements in the identifying portion. The oscillator frequency signals advance in the same coded manner as in the first embodiment, thus reporting to the recognition portion by their sequence the identification of the particular identifier. Detection of the two frequencies involved may be by (a) counting the radio frequency cycles over a fixed period of time, or (b) sensing pulses, as described in the first reference, or (c) using the technique of spectrum analyzer instruments. Again, the identification signals may be sent to a data processor communicating with the recognition portion to perform various functions including, recording the identification value, and the time at which the identifier was presented.

An advantage of the present invention is that it provides a recognition and identification system which is capable of providing a large code population.

Another advantage of the present invention is that it provides a recognition and identification system which does not require a separate power source for the identification portion.

A further advantage of the present invention is that it provides a recognition and identification system which may be tuned to a multiplicity of different data frequencies.

A further advantage of the present invention is that it provides a recognition and identification system which is efficient in rejecting noise and minimizing transmission time.

These and other objects of the present invention will become obvious to those of ordinary skill in the art after having read the following detailed description of the preferred embodiments as illustrated in the various drawing figures.

IN THE DRAWING

FIG. 1 is a circuit diagram of a recognition and identification system incorporating the teachings of the present invention;

FIG. 2 illustrates various wave forms and time relativity of signals in the system of FIG. 1; and FIG. 3 is a circuit diagram of a second embodiment of a recognition and identification system of the present invention.

DETAILED DESCRIPTION OF THE PREFERRED EMBODIMENT

Referring to FIG. 1, there is illustrated therein a circuit diagram for a recognition and identification system of the present invention and referred to by the general reference character 10. The system 10 incorporates a recognition portion referred to by the general reference character 12 and an identification portion referred to by the general reference character 14. The recognition portion 12 includes a time base generator 15 joined via a junction 16 to a radio frequency pulse generator 17 which is connected to a junction 18 common to a coil 20 which serves as an antenna. The other end of the coil 20 is tied to ground reference.

The time base generator 15 is also connected via the junction 16 to a ramp voltage generator 22. The output of the ramp generator 22 is joined to a voltage controlled oscillator 24 which in turn is connected to an amplifier 26. The output of the amplifier 26 is tied to impedance 28 which in turn is connected to the terminal 18.

The input to an amplifier 30 is tied to the terminal 18 with the output of amplifier 30 tied to a detector 32. The output of the detector 32 is tied to a frequency measuring network 44. The input of the network 44 is also tied to the voltage controlled oscillator 24. The output of the frequency measurer 44 is provided at an output 46 which may extend to a microprocessor 47. The microprocessor 47 is also tied to the time base generator 15. The detector 32 is also tied to a comparator 48. The other input to the comparator 48 is tied to a fixed resonance and resonance detector 49 and the comparator output is tied to a terminal 50 common to the input of the microprocessor 47.

Referring now to the identification portion 14, it is generally in the form of a flat card or similar object which can be readily carried by an individual in a pocket, wallet, purse, etc. The identification portion 14 includes a coil 60 which serves as a loop antenna. The coil 60 may be inductively coupled to the coil 20 depending on the relative physical proximity of the two coils to one another and the power of the signals on the coils. One end of the coil 60 is tied to card ground reference and the other is tied to a junction 62. Also tied to the junction 62 is a diode 64 of which the cathode is tied to a capacitor 66. The other end of the capacitor 66 is tied to card ground reference. A potential source V+ is developed across the capacitor 66.

A capacitor 68 is tied across the coil 60 with one end tied to the terminal 62 and the other end to card ground reference. Also connected to the terminal 62 is one end of a capacitor 70 of which the other end is tied to a terminal 72. A varactor 74 is tied between the terminal 72 and the ground reference.

A diode 76 is connected to the terminal 62 and to a bit counter 84. The output of the bit counter 84 is tied to a decoder network 86 through a group of leads 88. The combination of the bit counter 84 and decoder network 86 constitute a data register 89. The decoder 86 is tied to an OR gate 90 by means of a plurality of leads 92. The output of the OR gate 90 is tied to the terminal 72 to control the varactor 74.

Also, illustrated in broken lines, is an amplifier 93 tied in series between the terminal 62 and a counter 94. The counter 94 may be tied to the input of the bit counter 84.

In operation the time base generator 15 controls the sequence of events. There is first a command to the pulse generator 17 and a power pulse is emitted via the antenna 20. Next, there is a timing command to the ramp generator 22. There is also a timing signal to the microprocessor 47 to distinguish bits and to provide first half data cell and second half data cell timing to aid or to allow distinction between binary "1's" and "0's".

The pulse from the generator 17, (shown as "a" in FIG. 2), and applied to the coil 20, results in energy being radiated to the coil 60. Part of this energy resulting from the RF pulse is rectified by the diode 64 and energy is stored in the capacitor 66 so as to provide a power source V+ for the identifier portion 14. The value of V+ may be in the order of three to six volts. Also, a portion of the energy from the power pulse is applied to the diode 76 to cause the sequential sequence advance of the bit counter 84. Upon receipt of the first power pulse, the bit counter 84 commences its count.

After the initial pulse (shown as "a" in FIG. 2) from the pulse generator 17, and before the succeeding power pulse, the ramp generator 22 sweeps through a range of voltages, (see "b" of FIG. 2), thus causing the voltage controlled oscillator 24 to pass through a range of radio frequencies. The RF signals from the oscillator 24 pass through the amplifier 26 and the impedance 28 to the coil 20. Radiation is emitted from the coil 20 through the range of radio frequencies. This radiation is picked-up by the coil 60 of the identifier portion 14 provided the card 14 is within the adequate physical proximity of the coil 20. Across the coil 60 is the capacitor 68, and also across the coil 60 is the series combination of the capacitor 70 and the varactor 74 which acts as a capacitor. The combination of the coil 60 and the capacitors 68 and 70 and varactor 74 resonate at a certain radio frequency depending on their value. A first resonant frequency $f_1$ will exist when the varactor 72 has zero volts across it and a second resonant frequency exists when the varactor 74 has a voltage applied. Note that there is always a reactive impedance across the coil 60 such that it is never damped out or detuned. Thus, there is continuously a resonant frequency with the value being either $f_1$ or $f_2$, depending upon the condition of the varactor. The voltage condition of the varactor is determined by the signal at the junction 72.

When the radiation passes through a frequency coinciding with one of the resonant frequencies $f_1$ to $f_2$, the resonant condition is communicated to the antenna coil 20 and is made observable by a perturbation appearing in the frequency envelope at the resonant frequency e.g. waveform "c" of FIG. 2. The waveform is amplified by the amplifier 30 and the perturbation in the envelope is detected by the detector 32. The fluctuation in the output of the detector coincides with the perturbation, (see waveform "d" of FIG. 2). The timing of the signals "d" coincides with the resonant frequency $f_1$ or $f_2$. The signal "d" is further amplified by the amplifier 48 and appears on the output terminal 50.

The frequency of resonance is either $f_1$ or $f_2$, depending on whether the varactor part of the circuit in the identification portion 14 is at maximum or minimum capacitance. The varactor 74 has maximum capacitance when the voltage at the terminal 72 is low and minimum capacitance when the voltage at terminal 72 is high. The rise and fall of the voltage at terminal 72 is determined by a binary signal, e.g. signal "e" of FIG. 2 from the OR circuit 90. Thus, at binary "0" the resonant frequency is "$f_1$" and at binary "1" the resonant frequency is "$f_2$". The data for the signals are determined by the bit counter 84 and decoder 86, which together are the data register 89. The bit counter 84 advances through its count, responsive to each power pulse at the input of the bit counter 84. The count is fed over the group of lines 88 to be decoded by the decoder 86 to one of a group of individual lines 92. Each line of group 92 is left full or cut in order to pass or not pass the signals. The lines 92 are cut according to the specific code to be identified with the particular card 14.

The group of lines 92 are brought together at the OR gate 90 such that emitted from the OR gate 90 is a series of rises or falls of control voltage to the terminal 72 thereby causing variations in the capacitance of the varactor 74. This in turn causes variations in the resonant frequency between $f_1$ and $f_2$. These variations between $f_1$ and $f_2$ and their sequence carry the intelligence or code of the identification portion 14. The resonant frequency $f_1$ or $f_2$ will be measured during each cycle of the sweep oscillator whenever the identifier portion 14 is within adequate coupling proximity to the recognition portion 12. The waveform "f" illustrates that for a bit "1" the resonant frequency of the identification portion is $f_2$ and for a bit "0" the resonant frequency is $f_1$, and that there is at all times a full valued signal.

As illustrated in FIG. 2, wave form "b", the ramp voltage from the ramp generator 22 repeats between each cycle of the RF pulse generator 17. The frequency of the voltage controlled oscillator 24 varies with this ramp voltage. As the frequency varies and passes through the resonance points $f_1$ and $f_2$, a perturbation occurs in the RF envelope across the coil 20 illustrated by waveform "c". After the detection process on this wave, an audio or envelope frequency signal appears at the output 35 of the detector 32 and is illustrated by waveform "d".

Thus, for each cycle of the RF pulse from the generator 17, data pulses are generated at the output of the detector 32. Each data pulse triggers the frequency measurer block 44 to read the instantaneous frequency of the voltage controlled oscillator 24. The VCO 24 sweeps the frequencies for each cycle of the RAMP generator 22. The output of the frequency measurer circuit 44 reports to the microprocessor the values of $f_1$ or $f_2$ from the identification portion 14 on each step of counter 84.

The output of the frequency measurer network 44 is received by the microprocessor 47 for processing to determine the code sequence and code values for determination of the identification code. Based on the identification code, the appropriate functions occur.

The detected signals in the line 35 may also be received by the comparator 48 for comparison to signals from a fixed resonance detector 49. Based on presence or absence of a signal equality, an output signal is delivered to the microprocessor 47 for processing.

As previously discussed, the RF pulses from the generator 17 may be used to advance the bit counter 84 for each cycle of the pulse. The bit counter 84 is illustrated with four output lines and the output of the decoder 86 may have sixteen output lines. As the bit counter advances, from the sixteen lines, the potential combination of coded rises and falls of the voltage applied to the varactor 74 is 256.

FIG. 2 further illustrates a line "g" showing the time allocated to each bit. The following describes the timing of the data analysis process. The sequence of "bit cells" shown by waveform "g" are labeled "bit 1", "bit 2", "bit 3", etc. corresponding to the advancing positions of the bit counter 84. In analyzing the signal, with the two values $f_1$ and $f_2$ of frequency involved, the detection of the frequencies $f_1$ and $f_2$ occur at differing times within each cycle, specifically in either the first half or the second half of the bit cell. The time window diagram "h" illustrates the bit cells each divided into two equal parts 98 and 99 labeled T1-1, T1-2, T2-1, T2-2, T3-1, etc. If a response falls within the first half of a cell, such as T1-1 or T2-1, it is a "zero" valued bit. If the response falls within the second window of a cell, such as T1-2, or T2-2, it is a "one" value bit. Thus, since there are two frequencies to be determined, i.e. $f_1$ or $f_2$, the timing of the perturbation in each sweep is utilized to determine the identification code.

FIG. 1 shows a method of advancing bit counter 84 alternative to the previously described method which used power impulses through diode 76. The alternate method brings radio frequency signals from coil 60 to amplifier 93 and then to the counter 94. After counter 94 reaches a preset value it sends an advance pulse to counter 84. When advancement occurs without power pulses, less power pulses are needed, and transmission is reduced.

FIG. 3 illustrates an alternative embodiment of a recognition-identification system of the present invention and referred to by the general reference character 100. Those elements of the system 100 which are common to the elements of system 10 of FIG. 1 carry the same reference number distinguished by a prime designation.

The recognition and identification system 100 carries a recognition portion referred to by the general reference character 102 and an identification portion referred to by the general reference character 104. In the system 100 a variable radio frequency oscillator 106 is included in the identification portion. The oscillator 106 utilizes positive feedback and includes an impedance 108 and an impedance 110 extending between the output of an amplifier 111 and the input of an amplifier 112. An impedance 114 extends between the junction 115 of the impedances 108 and 110 to a junction 116 of the amplifiers 111 and 112. The varactor 74' extends between ground and the junction of the amplifiers 111 and 112 through the capacitor 70'. In operation the net impedance value within the oscillator 106 is varied by the value of the variable capacitance effect of the varactor 74' which functions through the series capacitor 70'. The effect of this impedance change is to change the frequency of the oscillator 106 between $f_1$ and $f_2$.

The oscillator 106 is connected to the coil 60' through an impedance 117. The impedance 117 isolates the oscillator 106 from other effects such as the power impulses from the pulse generator 17'. The oscillator 106 operates throughout a reading cycle responsive to the sequence of binary signals from the OR circuit 90 and communicates its values and sequence of frequencies through the loop coil 60' to the recognition portion 102 through inductive coupling to the coil 20'.

The recognition portion 102 of the system 100 includes similar components to the recognition portion of the system 10 with the exception of a beat detector 120 and an amplifier 122. The beat detector 120 is connected to receive the output from the amplifier 30' and the output from the voltage controlled oscillator 24'. The output of the beat detector is tied to an amplifier 122.

In operation, power and synchronization are delivered to the identifier portion 104 by the RF pulses from the pulse generator 17', i.e. signals "a" of FIG. 2. The oscillator 106 in the identifier portion 104 resonates at either $f_1$ or $f_2$ depending on whether the binary signal from the OR circuit 90 indicates a "0" or "1". Code advance is as previously described in connection with the system 10. The response, in the recognition portion 102 is measured somewhat differently from that of the system 10 however. A sweep oscillator sub-system is formed by the ramp generator 22' and voltage controlled oscillator 24'. The frequency signal from the oscillator 24' is tied directly to the beat detector 120. The coil 20', through induction with the coil 60', receives radio frequency signals from the loop 60' and these signals are amplified by the amplifier 30' and then compared with the internal sweep from the voltage controlled oscillator 24' in the beat detector 120. The sub-system operates in a manner similar to that of a spectrum analyzer. When the frequency of the sweep oscillator 24' passes through the frequency of the signal received from the oscillator 106 e.g. $f_1$ or $f_2$, a "beat" or mixing of the two frequencies occurs and there is an audio frequency output from the amplifier 122. The audio output of the amplifier 122 is in the form of one or a small group of pulses and this signal triggers the frequency measure network 44'. The frequency of the oscillator is measured by the frequency measurer block 44'. The output to the microprocessor 47' is the value and sequence of frequencies $f_1$ and $f_2$ of the oscillator 106 and thus represent the code of identification portion 104.

The system 100 also includes a counter 124 on the identification portion 104. The counter 124 reduces the radio frequencies $f_1$ and $f_2$ to audio frequencies so that the bit sequence may be transmitted over a telephone system with the use of a voice coupler 126. This usage is convenient for making transactions over the telephone, such as for example, credit card orders. Such application has wide use. For example, it would decrease errors and the opportunity for fraudulent orders by allowing delivery or mailing only to the correct home address. Power for operation of the coupler and counter may be from a power plug near the telephone or a combined battery package and phone transmitter package into which the card is plugged. A similar telephone convenience can be provided for the system 10 of FIG. 1 if the auxiliary home device includes the added capability of its own sweep oscillator.

Within the systems of FIG. 1 or FIG. 3, the memory technique used by the identifier 14 or 104 in the data register 89 formed from blocks 84 and 86 may take several forms. As illustrated, the leads 92 are left whole to create a "one" or cut to create a "zero". The leads to be cut may be on a circuit board of the identifier 14 portion or may be cut on the integrated circuit chip in which case a cutting could be done by a laser beam, or may be cut in the manner of a fusable diode. Further, integrated circuit memories could provide the code, such as a random access memory (RAM); a read only memory (ROM)' or programmable read only memory (PROM). In the case of these latter semiconductor memories, the mode of read-out may be accomplished by shifting the code using shift register techniques and the bit value which exits is utilized for varactor control.

Although the present invention has been described in terms of the presently preferred embodiments, it is to be understood that such disclosure is not to be interpreted as limiting. Various alterations and modifications will no doubt become apparent to those skilled in the art having read the above disclosure. Accordingly, it is intended that the appended claims be interpreted as covering all alterations and modifications as fall within the true spirit and scope of the invention.

I claim:

1. An electronic recognition-identification system comprising:

a recognition network with a sweep oscillator for generating signals of various frequencies, a first antenna means for radiating signals responsive to the oscillator frequencies and for radiating to another antenna means, means connected to said first antenna means for detecting perturbations in the signals across said first antenna means and for delivering information signals responsive to said perturbations; and an identification network including a second antenna means for radiating to said first antenna means, a data register means to advance and provide a sequence of data, a reactance modulation circuit connected to the second antenna means and to said data register means such that the frequency of said modulation circuit varies responsive to said sequence of data.

2. An electronic recognition-identification system of claim 1 wherein said first antenna is an inductive loop, and said second antenna is an inductive loop, and said radiating is by inductive coupling.

3. An electronic recognition-identification system of claim 1 wherein, said identification network includes a reactance modulation circuit with said frequency controlled by said reactance modulation circuit.

4. An electronic recognition-identification system of claim 1 wherein, said reactance modulation circuit includes a varactor and the resonant frequency of said circuit is variable responsive to control voltage on said varactor.

5. An electronic recognition-identification system of claim 4 wherein, the recognition network includes an amplifier and detector circuit to sense the perturbations of the signal produced by the resonances of the identifier network, and an internal fixed resonance circuit and comparison means to compare said fixed resonance and said resonances of the identifier circuit, and output means responsive to said comparison means according to results of said comparison.

6. An electronic recognition-identification system of claim 4 wherein, the recognition network includes an amplifier and detector to sense the perturbations of the signal produced by the resonances of the identifier network, and an internal frequency measuring network to measure the frequencies produced by resonances of said identifier, and to transmit the frequency measurements to an output device.

7. An electronic recognition-identification system of claim 6 wherein,
   a data processing network is connected to said frequency measuring means for converting said frequency readings to a code representative of the identity of the identifier network.

8. An electronic recognition-identification system of claim 4 wherein
   the identifier includes a counter responsive to frequencies on said second inductive means, and emits pulses sequentially at a rate lower than said frequencies to advance said data register.

9. An electronic recognition-identification system of claim 1 wherein
   the identification network includes an oscillator operating within the radio frequency range, said oscillator having a frequency controlled by said reactance modulation circuit.

10. An electronic recognition-identification system of claim 9 wherein
    said reactance modulation circuit includes a varactor as an impedance element, said varactor being connected to the output of said data register means such that the control voltage of said varactor controlling said oscillator frequency and the control voltage is dependent on the output of said data register means.

11. An electronic recognition-identification system of claim 10 in which,
    the recognition network includes detector means for detecting a beat between the frequency of said oscillator of the identification network and said oscillator within the recognition network; and frequency reading means connected to said detector means for reading the radio frequency coincident with said beats.

12. An electronic recognition-identification system of claim 11 in which,
    the recognition network further includes a data processing means connected to said frequency reading means for converting said read frequencies to a code which represents the identifier which radiated said particular sequence of radio frequencies.

13. An electronic recognition-identification system of claim 1 in which,
    the recognition network includes a radio frequency pulse generator connected to said first antenna means for generating periodic pulses across said second antenna means, said data register means being connected to said second antenna means to receive said periodic pulses, said data register means providing data signals intermediate between control pulses.

14. An electronic recognition-identification system of claim 1 in which,
    the recognition network includes a radio frequency pulse generator connected to said first antenna means for generating periodic pulses across said second antenna means and to said bit counter, the advancement of said data register being determined by the occurrence of said periodic pulses.

15. An electronic recognition-identification system of claim 10 wherein
    said oscillator frequency is divided by a counter, and the output of said counter is connected to a means for transmission over equipment operational at frequencies lower than radio frequencies.

* * * * *